United States Patent
Fujiyama et al.

(10) Patent No.: US 7,796,861 B2
(45) Date of Patent: Sep. 14, 2010

(54) VIDEO REPRODUCING APPARATUS

(75) Inventors: Michihiro Fujiyama, Kyotanabe (JP); Aritaka Mizutani, Daito (JP); Seiji Hashimoto, Nishinomiya (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1225 days.

(21) Appl. No.: 11/348,326

(22) Filed: Feb. 7, 2006

(65) Prior Publication Data

US 2006/0177195 A1    Aug. 10, 2006

(30) Foreign Application Priority Data

Feb. 9, 2005    (JP) .............................. 2005-033490

(51) Int. Cl.
  H04N 5/91    (2006.01)
  H04N 7/26    (2006.01)
(52) U.S. Cl. ............................ 386/80; 386/46; 386/124
(58) Field of Classification Search .................. 386/46, 386/80–83, 124–126
See application file for complete search history.

(56) References Cited

U.S. PATENT DOCUMENTS 5,812,734 A * 9/1998 Shimoda et al. ............... 386/81
7,057,986 B2 * 6/2006 Fukuchi ..................... 369/47.31

FOREIGN PATENT DOCUMENTS

| JP | 07-212700 A | 8/1995 |
| JP | 10-174056 A | 6/1998 |
| JP | 2001-143388 | 5/2001 |
| JP | 2004-112005 A | 4/2004 |

OTHER PUBLICATIONS

Japanese Office Action dated Apr. 22, 2008, issued in corresponding Japanese Patent Application No. 2005-033490.

* cited by examiner

Primary Examiner—Thai Tran
Assistant Examiner—Mishawn Dunn
(74) Attorney, Agent, or Firm—Westerman, Hattori, Daniels & Adrian, LLP

(57) ABSTRACT

In a video reproducing apparatus of the present invention, it is monitored during reproduction whether or not there is a change in recording rate of a reproduced video signal. When there is a change in recording rate, a ratio of a reproducing rate to a recording rate is changed. This can realize a video reproducing apparatus capable of always reproducing the video at an appropriate rate to checking of the video regardless of a change in recording rate.

8 Claims, 8 Drawing Sheets

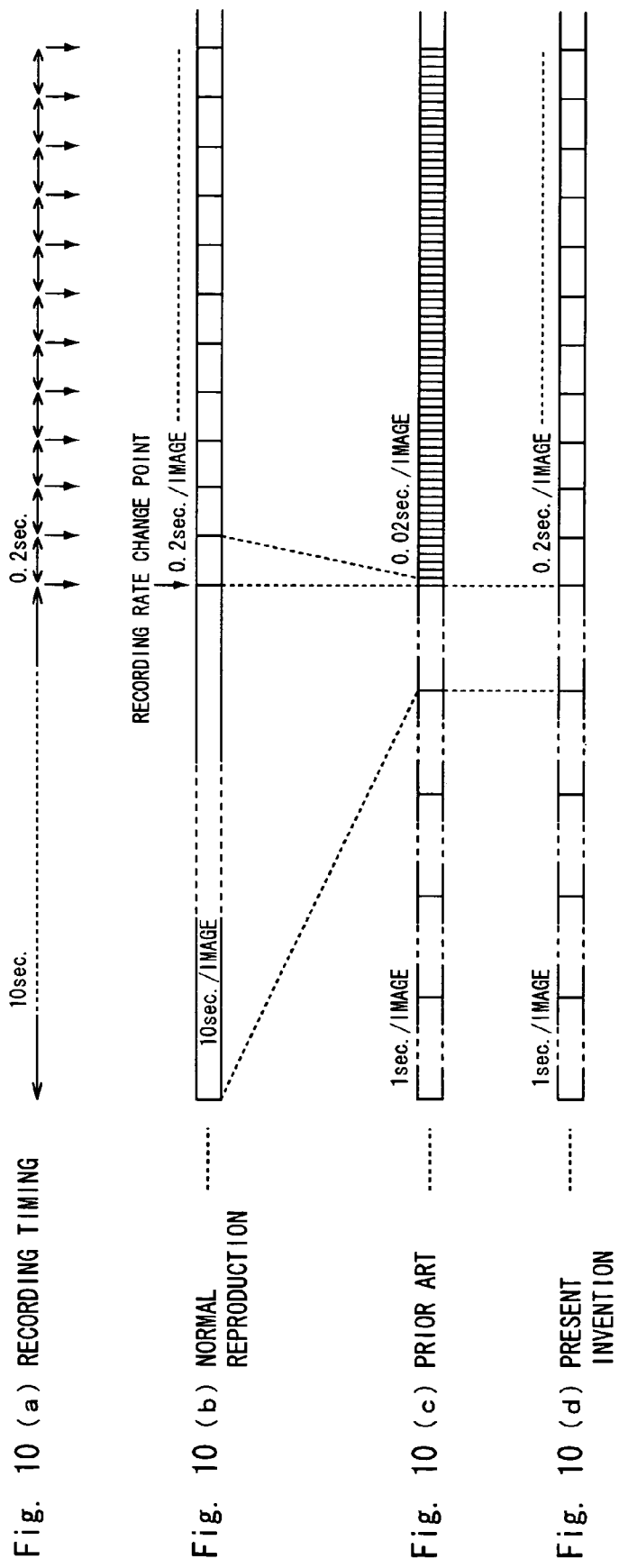

VIDEO REPRODUCING APPARATUS

The priority application No. 2005-033490 upon which this patent application is based is hereby incorporated by reference.

BACKGROUND OF THE INVENTION

1. Field of the Invention

The present invention relates to a video reproducing apparatus in which a ratio of a reproducing rate to a recording rate can be changed.

2. Description of Related Art

A video recording/reproducing apparatus for monitoring has been conventionally known that records and reproduces video photographed by a monitoring camera, the video recording/reproducing apparatus being capable of changing the recording rate.

In this type of video recording/reproducing apparatus, a recording operation starts at a previously set recording rate, for example. Thereafter if an unusual situation occurs in the monitored area and an alarm signal is input, then the recording rate automatically increases and the recording operation continues. Therefore, video with different recording rates will be recorded on a recording medium.

Thereafter, the video recorded on the recording medium as described above is displayed on a monitor device and checking of the video is done. If normal reproduction is performed, the checking will take such a long time as the recording time. For example, if normal reproduction is performed of a recording medium on which video is recorded at a rate of ten seconds per one image and thereafter further video is recorded at a rate of 0.2 seconds per one image as shown in FIG. 10(a), then the images will be displayed at a rate of ten seconds per one image and thereafter from the time point when the recording rate is changed to the rate of 0.2 seconds per one image, the images will be displayed at a rate of 0.2 seconds per one image as shown in FIG. 10(b). If the recording time is six hours, the checking will take a long time of six hours.

Checking of video can be done with image display at a rate of 0.1-0.2 seconds per one image. Accordingly, if the recording rate is low, checking is done using fast-forward reproduction.

On the other hand, if a switching rate for image display is high in normal reproduction because of a high recording rate, and therefore the video cannot be checked in detail, then the checking is done using slow reproduction.

However, in the conventional video recording/reproducing apparatus, after a fast-forward reproduction operation starts, the operation is maintained regardless of a change of the recording rate. If the recording rate becomes high during fast-forward reproduction, then depending on that rate, a switching rate for image display will become too high. This has caused a problem of difficulty of checking of video. For example, if fast-forward reproduction of a recording medium on which video is recorded at the recording rates shown in FIG. 10(a) is performed at a rate ten times of the recording rate, then images will be displayed at a rate of one second per one image and thereafter from the time point when the recording rate is changed to the rate of 0.2 seconds per one image, the images will be displayed at a high rate of 0.02 seconds per one image as shown in FIG. 10(c).

Also after a slow reproduction operation starts, the operation is maintained regardless of a change of the recording rate. If the recording rate becomes low during slow reproduction, then depending on that rate, a switching rate for image display will become too low. This has been a problem. For example, if slow reproduction is performed of a recording medium on which video is recorded at a rate of 0.2 seconds per one image and thereafter video is recorded at a rate of ten seconds per one image, then the images will be displayed at a rate of two seconds per one image and thereafter from the time point when the recording rate is changed to the rate of ten seconds per one image, the images will be displayed at an extremely low rate of 100 seconds per one image.

SUMMARY OF THE INVENTION

According to one embodiment of the present invention, there can be provided a video reproducing apparatus capable of always reproducing the video at an appropriate rate to checking of the video regardless of a change in recording rate.

In the video reproducing apparatus, during reproduction of a video signal recorded on a recording medium, it is judged whether or not there is a change in recording rate of the reproduced video signal, and a ratio changing operation for changing a ratio of a reproducing rate to a recording rate is performed when it is judged that there is a change in recording rate.

For example, the recording medium has recording rate information recorded thereon together with the video signal, and the judgment is made based on the recording rate information read out and reproduced from the recording medium. For example, a ratio of a reproducing rate to a recording rate is decreased when it is judged that the recording rate increases, while the ratio is increased when it is judged that the recording rate decreases.

In a first specific configuration, a ratio changing operation for setting a ratio of a reproducing rate to a recording rate to a predetermined value is performed when it is judged that there is a change in recording rate. In the specific configuration, when there is a change in recording rate, the ratio is set to a value of one, for example, to perform reproduction at the same rate as the recording rate.

In a second specific configuration, a ratio changing operation for changing a ratio of a reproducing rate to a recording rate to a value for setting the reproducing rate to a predetermined rate is performed when it is judged that there is a change in recording rate. As described above, checking of video can be done with image display at a rate of 0.1-0.2 seconds per one image. Accordingly, in the specific configuration, when there is a change in recording rate, the ratio is set to a value for setting the reproducing rate to a rate of 0.1-0.2 seconds per one image, for example, to perform reproduction at the rate.

Specifically, when it is judged that the recording rate increases, it is judged whether or not fast-forward reproduction is being performed in which a ratio of a reproducing rate to a recording rate is greater than one, and the ratio changing operation is performed when the fast-forward reproduction is being performed, while when it is judged that the recording rate decreases, it is judged whether or not slow reproduction is being performed in which a ratio of a reproducing rate to a recording rate is smaller than one, and the ratio changing operation is performed when the slow reproduction is being performed.

As described above, if the recording rate is low, fast-forward reproduction is performed in order to reduce time for checking of the video. Therefore, it will be against a user's intention if the fast-forward reproduction is switched to normal reproduction when the recording rate decreases during the fast-forward reproduction. On the other hand, if the recording rate is high, slow reproduction is performed in order for the video to be checked in detail. Therefore, it will be against a user's intention if the slow reproduction is switched to normal reproduction when the recording rate increases during the slow reproduction. Accordingly, in the above-described specific configuration, when the recording rate increases, the above-described ratio changing operation is performed only if the fast-forward reproduction is being performed. When the recording rate decreases, the above-described ratio changing operation is performed only if the slow reproduction is being performed.

Further specifically, it is judged whether or not the amount of increase or amount of decrease of the recording rate exceeds a threshold value, and the ratio changing operation is performed when it is judged that the recording rate increases and that the amount of the increase exceeds the threshold value, while the ratio changing operation is performed when it is judged that the recording rate decreases and that the amount of the decrease exceeds the threshold value.

In the above-described specific configuration, the ratio changing operation is performed only when the amount of increase or amount of decrease of the recording rate exceeds a threshold value, such that a ratio of a reproducing rate to a recording rate can be prevented from being frequently changed.

As described above, according to the video reproducing apparatus of one embodiment of the present invention, a ratio of a reproducing rate to a recording rate is changed when there is a change in recording rate, and therefore the video can always be reproduced at an appropriate rate to checking of the video regardless of a change in recording rate.

BRIEF DESCRIPTION OF THE DRAWINGS

FIG. 10(a) to FIG. 10(d) illustrate a conventional problem and an effect of the present invention.

DETAILED DESCRIPTION OF THE INVENTION

With reference to the drawings, a description will be given below of the present invention embodied in a hard disk recorder capable of recording and reproducing video photographed by a monitoring camera.

Figure 1:
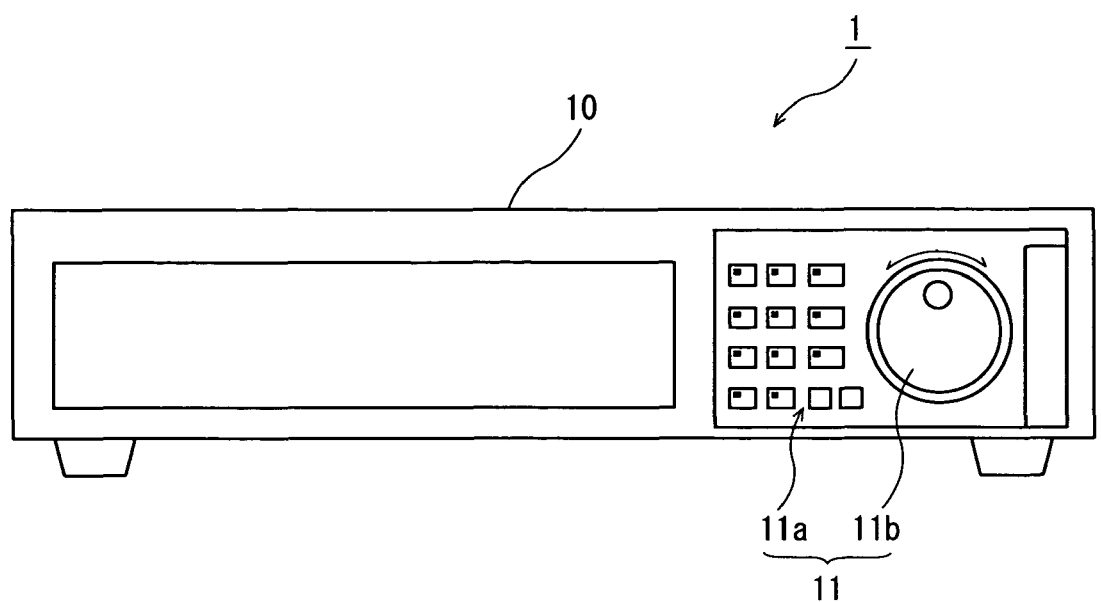
FIG. 1 is a front view of a hard disk recorder embodying the present invention.

A hard disk recorder 1 of the present invention includes a rectangular parallelepiped case 10 as shown in FIG. 1. An input device 11 for inputting various items of information is arranged on a front face of the case 10. The input device 11 includes a manipulation button group 11a including a reproducing button to be manipulated to start reproduction and a recording button to be manipulated to start recording, and a jog dial key 11b to be manipulated to change a ratio of a reproducing rate to a recording rate. During forward reproduction, the ratio can be increased by turning the jog dial key 11b clockwise, and the ratio can be decreased by turning it counterclockwise. On the other hand, during backward reproduction, the ratio can be increased by turning the jog dial key 11b counterclockwise, and the ratio can be decreased by turning it clockwise.

Figure 2:
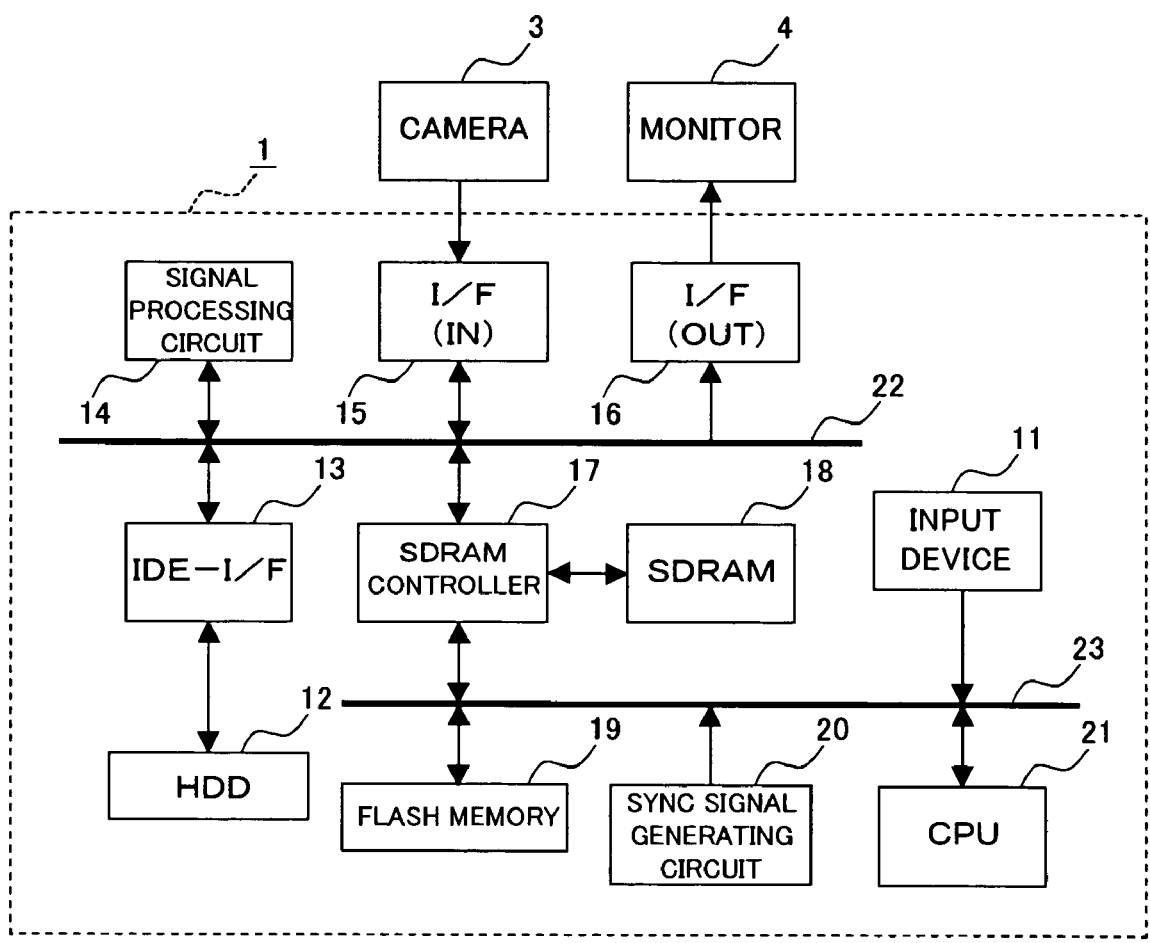
FIG. 2 is a block diagram showing a configuration of the hard disk recorder.

FIG. 2 shows an electrical configuration of the above-described hard disk recorder 1. The recorder 1 is provided with a hard disk drive (HDD) device 12 for driving a hard disk. The HDD device 12 is connected to a first bus 22 through an IDE interface 13. Connected to the bus 22 are a signal processing circuit 14 for performing a signal processing such as a compression/decompression processing by the JPEG method, an input interface 15 for connecting a monitoring camera 3, and an output interface 16 for connecting a monitor device 4. An SDRAM 18 used for a signal processing is also connected to the bus 22 through an SDRAM controller 17.

The SDRAM controller 17 is connected to a second bus 23. Connected to the bus 23 are a flash memory 19 for storing various information, a synchronization signal generating circuit 20 for generating a synchronization signal of 60 Hz, the above-described input device 11, and a CPU 21 for performing a predetermined control operation.

In the hard disk recorder 1, the above-described jog dial key 11b is manipulated to set a recording rate to a desired rate, and thereafter the recording button included in the manipulation button group 11a is depressed to start a recording operation at the rate. Thereafter if an unusual situation occurs in the monitored area and an alarm signal is input, then the recording rate automatically increases and the recording operation continues.

In the case of recording, a video signal of the NTSC method obtained from the monitoring camera 3 is fed to the input interface 15 and converted to digital image data. The image data is stored in the SDRAM 18 based on the synchronization signal at a recording rate (capture cycle) in accordance with a rotational position of the jog dial key 11b. For example, when the recording rate is a rate of 1/15 seconds per one image, the image data is stored at a rate of one image out of four images. The image data stored in the SDRAM 18 is fed to the signal processing circuit 14 and compressed by the JPEG method. Recording rate information rec_rate is superimposed on the compressed image data thus obtained to prepare composite video data. The composite video data thus prepared is recorded in the HDD device 12. The recording rate information rec_rate takes a value of n in the case where image data of one image is captured into the SDRAM 18 each time the synchronization signal is generated n times. For example, it takes a value of "1" in the case where the recording rate is at a rate of 1/60 seconds per one image, and takes a value of "4" in the case of a rate of 1/15 seconds per one image.

After the video is recorded in the HDD device 12 as described above, the reproducing button included in the manipulation button group 11a is depressed to start normal reproduction. Thereafter when the jog dial key 11b is manipulated to change a ratio of a reproducing rate to a recording rate, fast-forward reproduction or slow reproduction is performed.

In the case of reproduction, the composite video data read out from the HDD device 12 is once stored in the SDRAM 18, and then read out based on the synchronization signal at a reproducing rate in accordance with a rotational position of the jog dial key 11b as described below, fed to the signal processing circuit 14, and decompressed. The image data obtained from the signal processing circuit 14 is fed to the output interface 16 and converted to an analog image signal. The image signal is output to the monitor device 4.

Figure 3:
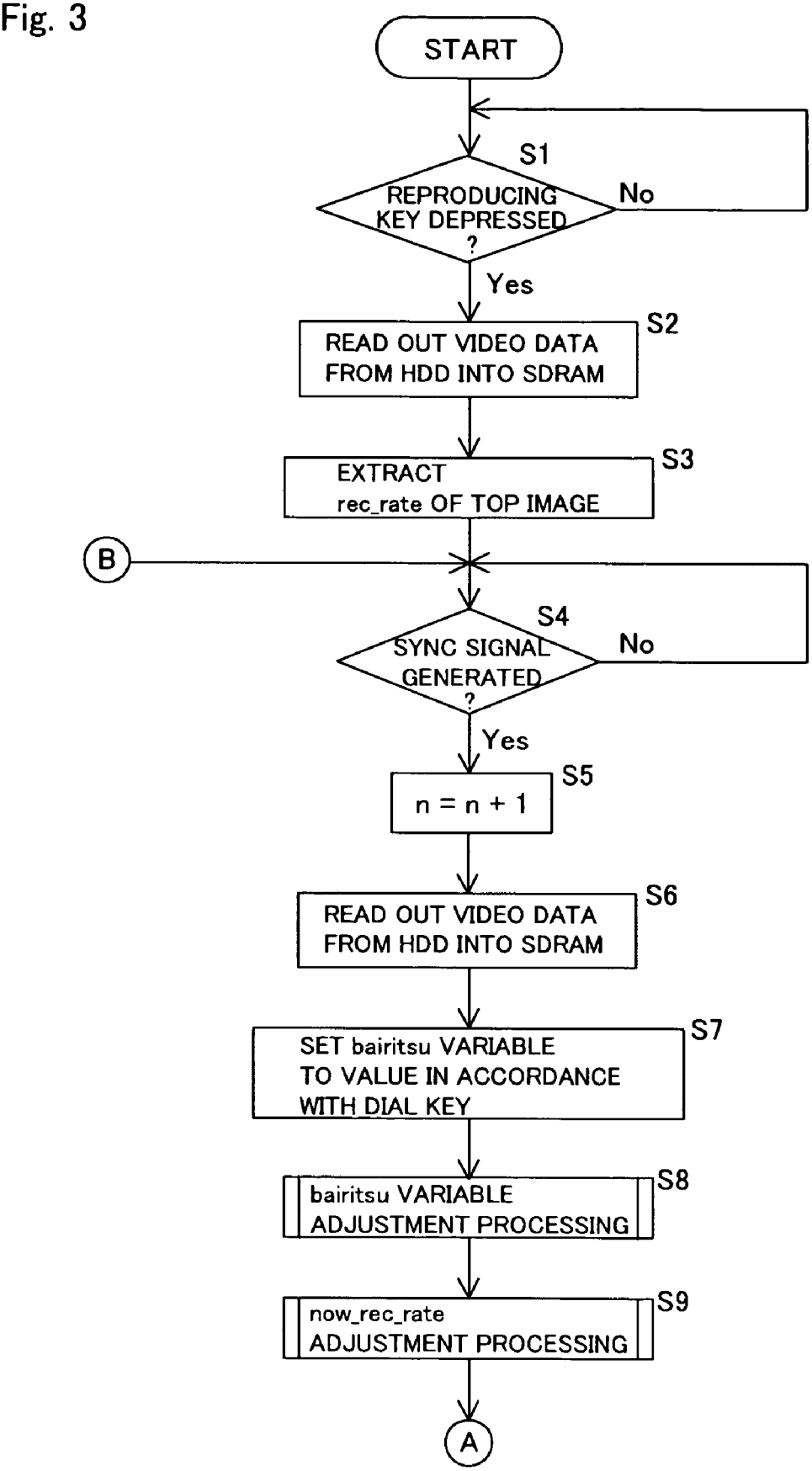
FIG. 3 is a flow chart showing a former part of a specific procedure to be performed in the case of reproduction in the hard disk recorder.
Figure 4:
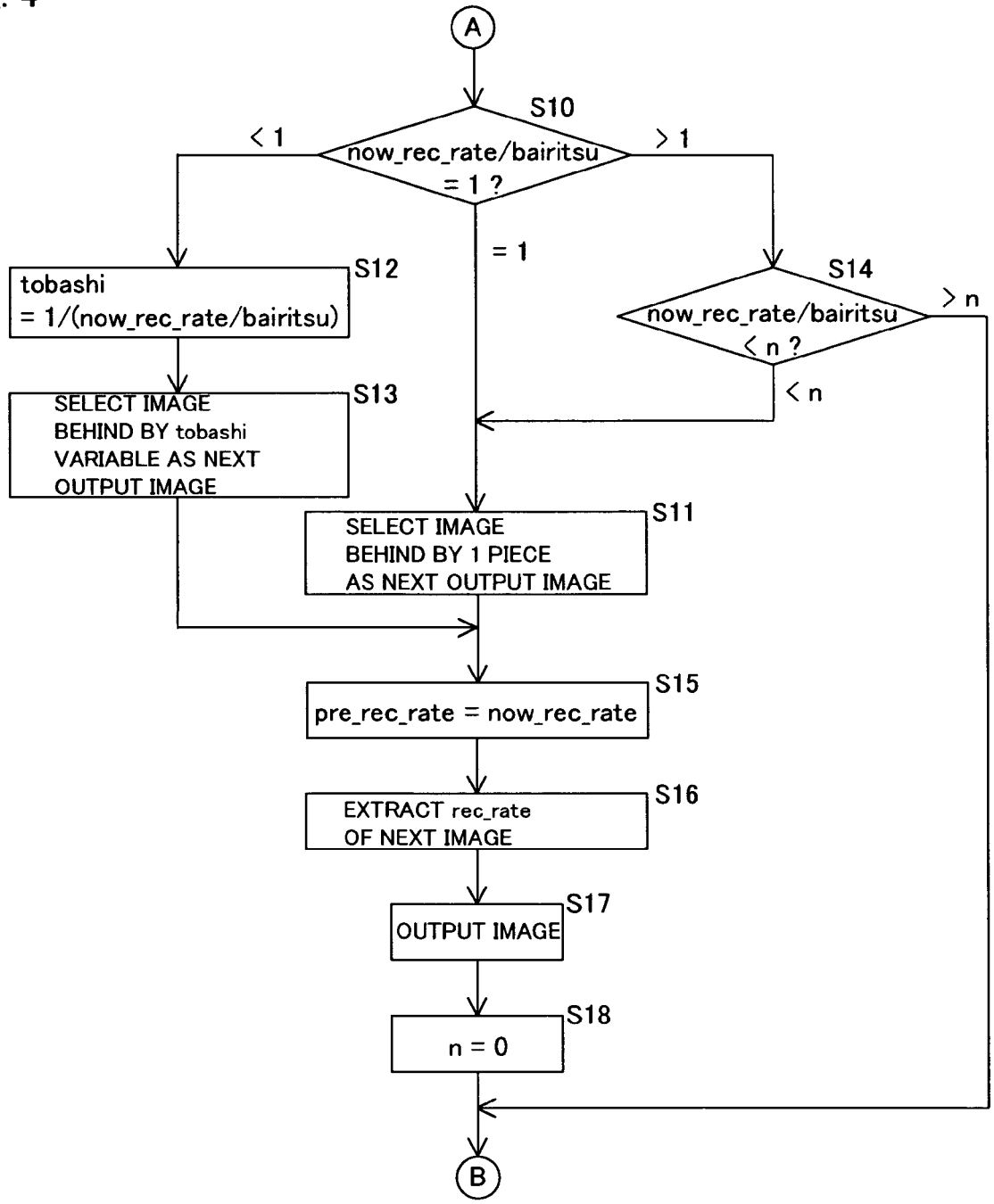
FIG. 4 is a flow chart showing a latter part of the procedure.

FIG. 3 and FIG. 4 show a specific procedure to be performed in the case of reproduction in the above-described hard disk recorder 1. First in step S1, the recorder waits for depression of the reproducing key. At the time when a user depresses the reproducing key, step S2 follows to read out the composite video data for a plurality of images from the HDD device 12 into the SDRAM 18. Here, the read-out of the composite video data is performed from a recording start position of the composite video data to be reproduced or a position specified by the user.

Subsequently in step S3, recording rate information rec_rate of the top image is extracted from the composite video data stored in the SDRAM 18, and the recording rate information is set as current recording rate information now_rec_rate, while a value of "0" is set as past recording rate information pre_rec_rate. Thereafter in step S4, an inquiry is made as to whether or not the synchronization signal is generated from the synchronization signal generating circuit 20. Here, the frequency of the synchronization signal is 60 Hz as described above, and therefore the answer will be affirmative once every 1/60 seconds.

When the answer for step S4 is affirmative, step S5 follows to count up a counter variable n of a synchronization counter by one. Thereafter in step S6, the composite video data for a next plurality of images is read out from the HDD device 12 into the SDRAM 18.

Next in step S7, a ratio variable bairitsu representing a ratio of a reproducing rate to a recording rate is set to a value in accordance with a rotational position of the above-described jog dial key 11*b*. Thereafter in step S8, an adjustment processing for the ratio variable is performed. Further in step S9, an adjustment processing for the current recording rate information now_rec_rate is performed. The ratio variable adjustment processing in step S8 and recording rate information adjustment processing in step S9 will be described later.

Subsequently in step S10 in FIG. 4, a value obtained by dividing the current recording rate information now_rec_rate by the ratio variable bairitsu (now_rec_rate/bairitsu) is compared with a value of "1". When the value obtained by dividing the current recording rate information by the ratio variable is "1", step S11 follows to select an image behind by one piece as a next output image, and thereafter step S15 follows. In this case, reproduction will be performed at a rate of 1/60 seconds per one image as described below.

In contrast, when the value obtained by dividing the current recording rate information by the ratio variable is smaller than "1", step S12 follows to set an inverse of the division value as an image skipping variable tobashi. Subsequently in step S13, an image behind by the image skipping variable is selected as a next output image, and thereafter step S15 follows. In this case, images are skipped by the number in accordance with the image skipping variable, such that reproduction will be performed at a higher rate than the rate of 1/60 seconds per one image.

When the value obtained by dividing the current recording rate information by the ratio variable is greater than "1", step S14 follows to inquire whether or not the counter variable n of the synchronization counter is greater than the division value. When the answer is negative, step S4 in FIG. 3 follows again. Thereafter when the counter variable n of the synchronization counter exceeds the division value, the answer for step S14 is affirmative and step S11 follows to select an image behind by one piece as a next output image, followed by step S15. In this case, the procedure of step S4 to step S10 and step S14 is repeated until the counter variable n of the synchronization counter exceeds the division value, such that reproduction is performed at a lower rate than the rate of 1/60 seconds per one image.

In step S15, the current recording rate information now_rec_rate is set as past recording rate information pre_rec_rate. Next in step S16, recording rate information rec_rate of the next image selected as described above is extracted from the composite video data stored in the SDRAM 18, and the recording rate information is set as current recording rate information now_rec_rate. Subsequently in step S17, the compressed image data of the selected next image is decompressed and output to the monitor device 4. Finally in step S18, the counter variable n of the synchronization counter is reset to "0", and step S4 in FIG. 3 follows again to repeat the above-described procedure. Thereafter, the procedure ends when the user depresses the stop button, or when the composite video data recorded in the HDD device 12 is reproduced to the end.

According to the above-described procedure, when the ratio variable bairitsu is "1", normal reproduction will be performed at the same rate as the recording rate. When the ratio variable is greater than "1", fast-forward reproduction will be performed at a higher rate than the recording rate. When the ratio variable is smaller than "1", slow reproduction will be performed at a lower rate than the recording rate.

For example, if the recording rate is a rate of 1/30 seconds per one image and the ratio variable is "1", then the answer for step S14 is affirmative at the time when the counter variable n of the synchronization counter exceeds "2", and step S11 follows to select an image behind by one piece as a next image and output the image to the monitor device in step S17. In this way, normal reproduction is performed at the same rate as the recording rate.

If the recording rate is a rate of 1/30 seconds per one image and the ratio variable is "6", then a value of "3" is calculated as an image skipping variable tobashi in step S12. In step S13, an image behind by three pieces is selected as a next output image and output to the monitor device in step S17. In this way, fast-forward reproduction is performed at a rate six times of the recording rate.

Further, if the recording rate is a rate of 1/30 seconds per one image and the ratio variable is "1/2", then the answer for step S14 is affirmative at the time when the counter variable n of the synchronization counter exceeds "4", and step S11 follows to select an image behind by one piece as a next output image and output the image to the monitor device in step S17. In this way, slow reproduction is performed at a rate 1/2 times of the recording rate.

Figure 5:
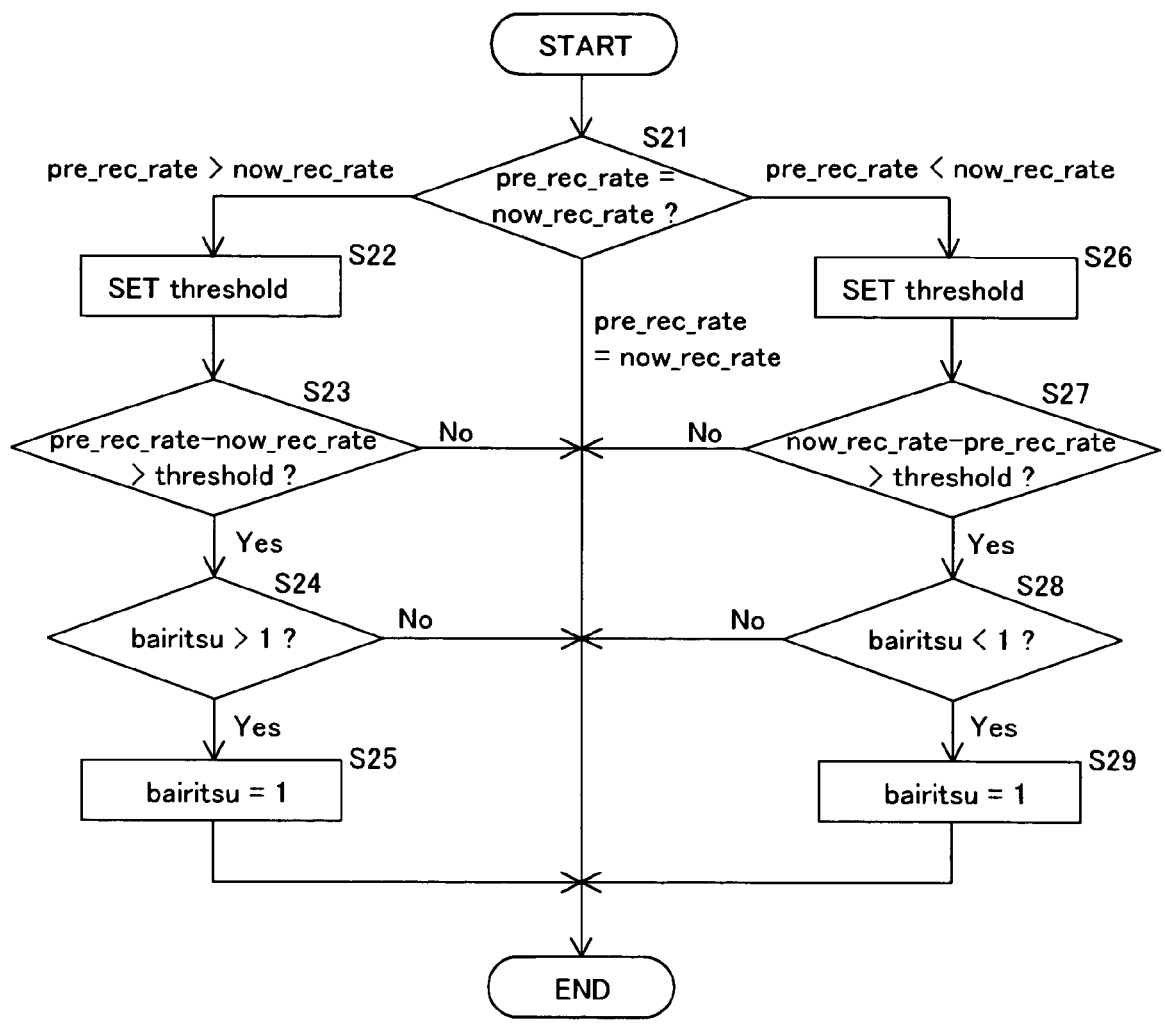
FIG. 5 is a flow chart showing a specific procedure of a ratio variable adjustment processing.

In the ratio variable adjustment processing in step S8 shown in FIG. 3, first in step S21 in FIG. 5, the past recording rate information pre_rec_rate is compared with the current recording rate information now_rec_rate. When both the recording rate information values are identical, the procedure ends and step S9 in FIG. 3 follows.

In contrast, when the current recording rate information now_rec_rate is smaller than the past recording rate information pre_rec_rate, step S22 follows to obtain a threshold value threshold. Here, usable as a threshold value is a predetermined value, or a value calculated from the current or past recording rate information using a function expression in which the recording rate information is a variable. Thereafter in step S23, an inquiry is made as to whether or not a value obtained by subtracting the current recording rate information now_rec_rate from the past recording rate information pre_rec_rate exceeds the threshold value. When the answer is negative, the procedure ends and step S9 in FIG. 3 follows. On the other hand, when the answer is affirmative, step S24 follows to inquire whether or not the ratio variable bairitsu is greater than one. When the answer is negative, the procedure ends and step S9 in FIG. 3 follows. On the other hand, the ratio variable bairitsu is greater than one, step S25 follows to set the ratio variable bairitsu to one, and thereafter step S9 in FIG. 3 follows.

When the current recording rate information now_rec_rate is greater than the past recording rate information pre_rec_rate, step S26 follows to obtain a threshold value threshold. Here, usable as a threshold value is a predetermined value, or a value calculated from the current or past recording rate information using a function expression in which the recording rate information is a variable. Thereafter in step S27, an inquiry is made as to whether or not a value obtained by subtracting the past recording rate information pre_rec_rate from the current recording rate information now_rec_rate exceeds the threshold value. When the answer is negative, the procedure ends and step S9 in FIG. 3 follows. On the other hand, when the answer is affirmative, step S28 follows to inquire whether or not the ratio variable bairitsu is smaller than one. When the answer is negative, the procedure ends and step S9 in FIG. 3 follows. On the other hand, the ratio variable bairitsu is smaller than one, step S29 follows to set the ratio variable bairitsu to one, and thereafter step S9 in FIG. 3 follows.

According to the above-described procedure, the ratio variable bairitsu is set to one when the recording rate becomes higher and the current recording rate information now_rec_rate becomes smaller than the past recording rate information pre_rec_rate, the difference between these exceeding a threshold value, and when fast-forward reproduction is performed in which the ratio variable bairitsu is greater than one. As a result, the fast-forward reproduction will be switched to normal reproduction. The ratio variable bairitsu is also set to one when the recording rate becomes lower and the current recording rate information now_rec_rate becomes greater than the past recording rate information pre_rec_rate, the difference between these exceeding a threshold value, and when slow reproduction is performed in which the ratio variable bairitsu is smaller than one. As a result, the slow reproduction will be switched to normal reproduction.

Figure 6:
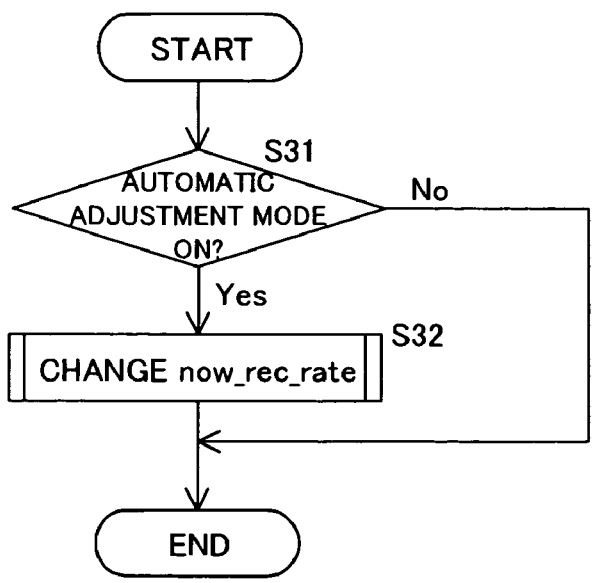
FIG. 6 is a flow chart showing a procedure of a recording rate information adjustment processing.

In the recording rate information adjustment processing in step S9 shown in FIG. 3, first in step S31 in FIG. 6, an inquiry is made as to whether or not an automatic adjustment mode is set to on. When the answer is negative, step S10 in FIG. 4 follows without performing any procedure. On the other hand, when the answer is affirmative, a recording rate information change processing shown in FIG. 7 is performed in step S32, and thereafter step S10 in FIG. 4 follows.

Figure 7:
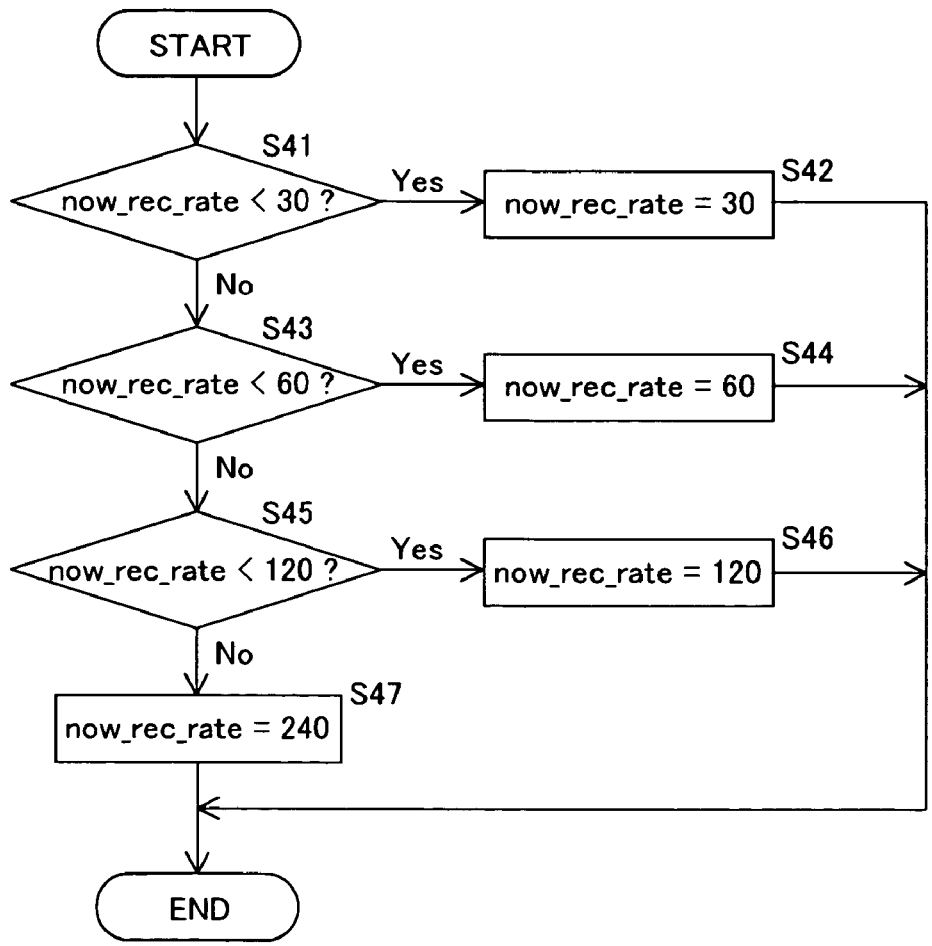
FIG. 7 is a flow chart showing a specific procedure of the recording rate information adjustment processing.

In the recording rate information change processing, first in step S41 in FIG. 7, an inquiry is made as to whether or not the current recording rate information now_rec_rate is smaller than "30". When it is smaller than "30", the recording rate information is set to "30" in step S42 to end the procedure. When the current recording rate information now_rec_rate is greater than "30", step S43 follows to inquire whether or not the recording rate information is smaller than "60". When it is smaller than "60", the recording rate information is set to "60" in step S44 to end the procedure. When the current recording rate information now_rec_rate is greater than "60", step S45 follows to inquire whether or not the recording rate information is smaller than "120". When it is smaller than "120", the recording rate information is set to "120" in step S46 to end the procedure. When the current recording rate information now_rec_rate is greater than "120", the recording rate information is set to "240" in step S47 to end the procedure. According to the above-described procedure, the current recording rate information now_rec_rate will be set to one of the values of "30", "60", "120" and "240".

When checking the video recorded in the HDD device 12, the user starts normal reproduction, and thereafter manipulates the jog dial key 11b while watching the video displayed on the monitor device 4 to adjust the reproducing rate. If normal reproduction is performed of the video recorded at a high rate, image display will be switched at the same high rate as the recording rate, and therefore the video cannot be checked in detail. Accordingly, when the current recording rate information now_rec_rate is smaller than "30", the recording rate information is set to "30" in accordance with the above-described procedure. This allows the video recorded at a higher rate than a rate of 0.5 seconds per one image to be displayed at the rate of 0.5 seconds per one image.

On the other hand, if normal reproduction is performed of the video recorded at a low rate, image display will be switched at the same low rate as the recording rate, and therefore a long time will be wasted. Accordingly, when the current recording rate information now_rec_rate is greater than "120", the recording rate information is set to "240" in accordance with the above-described procedure. This allows the video recorded at a lower rate than a rate of four seconds per one image to be displayed at the rate of four seconds per one image.

As described above, in the hard disk recorder 1 of the present invention, when the recording rate increases during fast-forward reproduction, and the amount of the increase exceeds a threshold value, the fast-forward reproduction is switched to normal reproduction at this time. When the recording rate decreases during slow reproduction, and the amount of the decrease exceeds a threshold value, the slow reproduction is switched to normal reproduction at this time. According to the hard disk recorder 1, the video can thus always be reproduced at an appropriate rate to checking of the video regardless of a change in recording rate.

For example, if fast-forward reproduction of a recording medium on which video is recorded at a rate of ten seconds per one image and thereafter further video is recorded at a rate of 0.2 seconds per one image as shown in FIG. 10(a) is started at a rate ten times of the recording rate, then the images will be displayed at a rate of one second per one image and thereafter when the recording rate is changed to the rate of 0.2 seconds per one image, the fast-forward reproduction is switched to normal reproduction and the images will be displayed at a rate of 0.2 seconds per one image as shown in FIG. 10(d).

Figure 8:
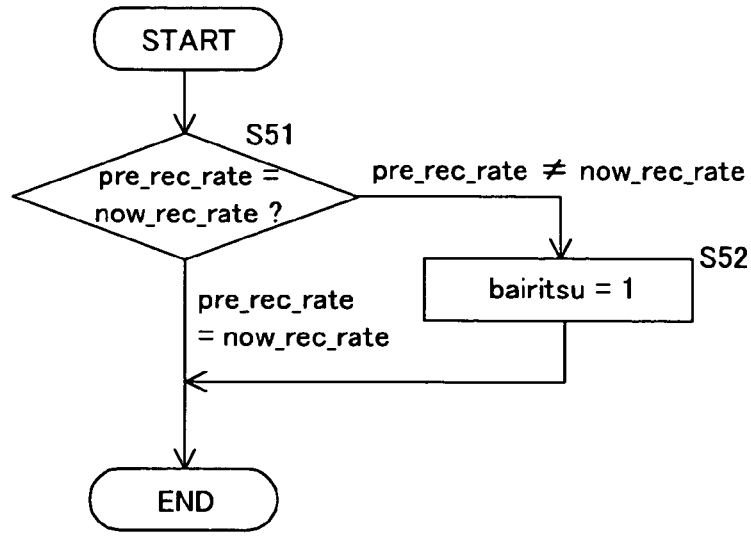
FIG. 8 is a flow chart showing a specific procedure of a ratio variable adjustment processing in another embodiment.
Figure 9:
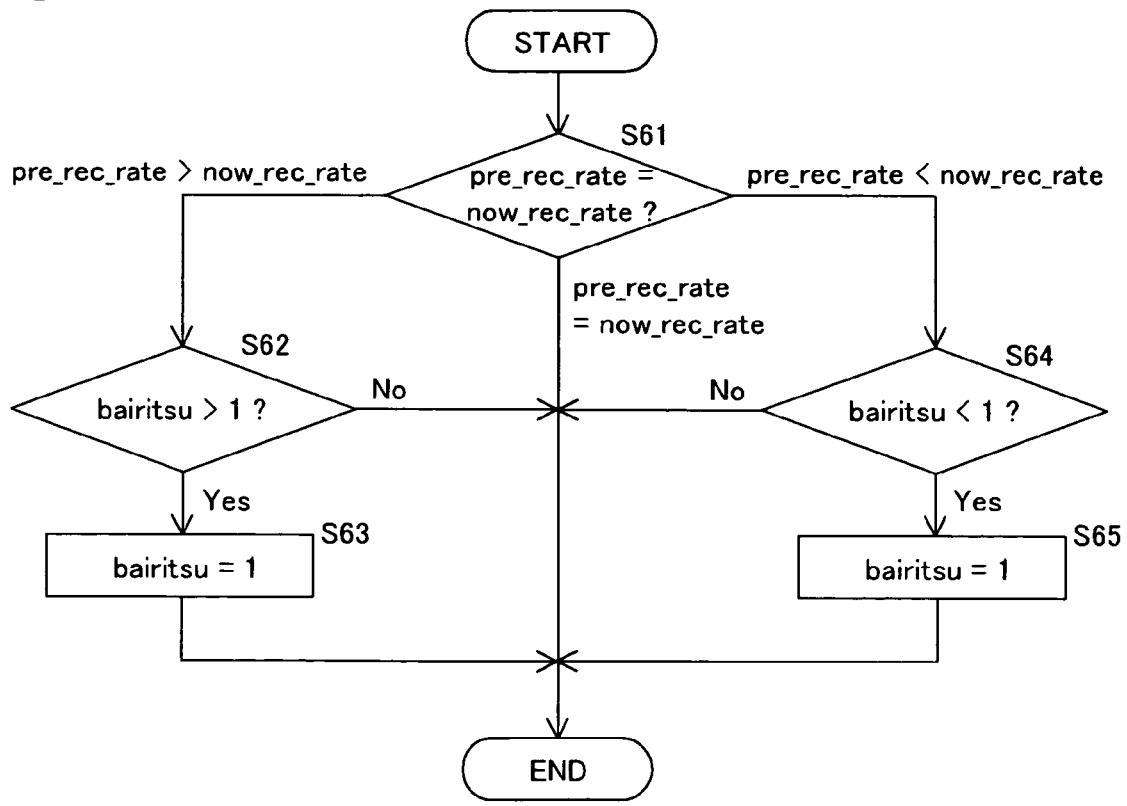
FIG. 9 is a flow chart showing a specific procedure of a ratio variable adjustment processing in still another embodiment.

Instead of the procedure shown in FIG. 5, a procedure shown in FIG. 8 or FIG. 9 may be used as a specific procedure of the ratio variable adjustment processing in step S8 shown in FIG. 3.

In the ratio variable adjustment processing shown in FIG. 8, first in step S51, an inquiry is made as to whether or not the current recording rate information now_rec_rate is identical with the past recording rate information pre_rec_rate. When the answer is affirmative, the procedure ends. On the other hand, when the answer is negative, the ratio variable bairitsu is set to "1" in step S52 to end the procedure.

On the other hand, in the ratio variable adjustment processing shown in FIG. 9, first in step S61, the present recording rate information now_rec_rate is compared with the past recording rate information pre_rec_rate. When both the recording rate information values are identical, the procedure ends. In contrast, when the current recording rate information now_rec_rate is smaller than the past recording rate information pre_rec_rate, step S62 follows to inquire whether or not the ratio variable bairitsu is greater than "1". When the answer is negative, the procedure ends. On the other hand, the ratio variable bairitsu is greater than "1", step S63 follows to set the ratio variable bairitsu to "1", and thereafter the procedure ends. When the current recording rate information now_rec_rate is greater than the past recording rate information pre_rec_rate, step S64 follows to inquire whether or not the ratio variable bairitsu is smaller than "1". When the answer is negative, the procedure ends. On the other hand, the ratio variable bairitsu is smaller than "1", step S65 follows to set the ratio variable bairitsu to "1", and thereafter the procedure ends.

In the above-described embodiment, the ratio variable bairitsu is set to "1" as shown in FIG. 5 when the recording rate becomes higher during fast-forward reproduction, and when the recording rate becomes lower during slow reproduction. However, the ratio variable may be set to a value for setting the reproducing rate to a predetermined rate, for example, a rate of 0.1-0.2 seconds per one image.

A ratio of a reproducing rate to a recording rate is changed in accordance with a manipulation of the jog dial key 11b. However, a "+" button and "−" button may be arranged to change the ratio in accordance with a manipulation of these buttons.

What is claimed is:

1. A video reproducing apparatus comprising:
   a reproducer for reproducing a video signal recorded on a recording medium;
   a judging portion for judging during reproduction whether or not there is a change in recording rate of the reproduced video signal; and
   a rate controller for performing a ratio changing operation for changing a ratio of a reproducing rate to a recording rate when it is judged that there is a change in recording rate,
   wherein the judging portion further judges whether or not an amount of the change in recording rate is greater than a threshold value, and the rate controller performs the ratio changing operation when it is judged that there is a change in recording rate and it is judged that an amount of the change in recording rate is greater than the threshold value.

2. The video reproducing apparatus according to claim 1, wherein the recording medium has recording rate information recorded thereon together with the video signal, and the judging portion makes the judgment based on the recording rate information read out and reproduced from the recording medium.

3. The video reproducing apparatus according to claim 1, wherein the rate controller performs a ratio changing operation for setting a ratio of a reproducing rate to a recording rate to a predetermined value when it is judged that there is a change in recording rate.

4. The video reproducing apparatus according to claim 1, wherein the rate controller performs a ratio changing operation for changing a ratio of a reproducing rate to a recording rate to a value for setting the reproducing rate to a predetermined rate when it is judged that there is a change in recording rate.

5. A video reproducing apparatus, comprising:
   a reproducer for reproducing a video signal recorded on a recording medium;
   a judging portion for judging during reproduction whether or not there is a change in recording rate of the reproduced video signal; and
   a rate controller for performing a ratio changing operation for setting a ratio of a reproducing rate to a recording rate to a predetermined value when it is judged that there is a change in recording rate, and
   wherein the rate controller comprises:
   a first changer for judging whether or not fast-forward reproduction is being performed in which a ratio of a reproducing rate to a recording rate is greater than one when it is judged that the recording rate increases, and performing the ratio changing operation when the fast-forward reproduction is being performed; and
   a second changer for judging whether or not slow reproduction is being performed in which a ratio of a reproducing rate to a recording rate is smaller than one when it is judged that the recording rate decreases, and performing the ratio changing operation when the slow reproduction is being performed.

6. The video reproducing apparatus according to claim 5, wherein the judging portion judges whether or not the amount of increase or amount of decrease of the recording rate exceeds a threshold value, and the first changer of the rate controller performs the ratio changing operation when it is judged that the recording rate increases and that the amount of the increase exceeds the threshold value, while the second changer performs the ratio changing operation when it is judged that the recording rate decreases and that the amount of the decrease exceeds the threshold value.

7. A video reproducing apparatus, comprising:
   a reproducer for reproducing a video signal recorded on a recording medium;
   a judging portion for judging during reproduction whether or not there is a change in recording rate of the reproduced video signal; and
   a rate controller for performing a ratio changing operation for changing a ratio of a reproducing rate to a recording rate to a value for setting the reproducing rate to a predetermined rate when it is judged that there is a change in recording rate,
   wherein the rate controller comprises:
   a first changer for judging whether or not fast-forward reproduction is being performed in which a ratio of a reproducing rate to a recording rate is greater than one when it is judged that the recording rate increases, and performing the ratio changing operation when the fast-forward reproduction is being performed; and
   a second changer for judging whether or not slow reproduction is being performed in which a ratio of a reproducing rate to a recording rate is smaller than one when it is judged that the recording rate decreases, and performing the ratio changing operation when the slow reproduction is being performed.

8. The video reproducing apparatus according to claim 7, wherein the judging portion judges whether or not the amount of increase or amount of decrease of the recording rate exceeds a threshold value, and the first changer of the rate controller performs the ratio changing operation when it is judged that the recording rate increases and that the amount of the increase exceeds the threshold value, while the second changer performs the ratio changing operation when it is judged that the recording rate decreases and that the amount of the decrease exceeds the threshold value.

* * * * *